Jan. 8, 1935.  H. LINDEBERG  1,987,367
CREAM SEPARATOR
Filed Sept. 26, 1931
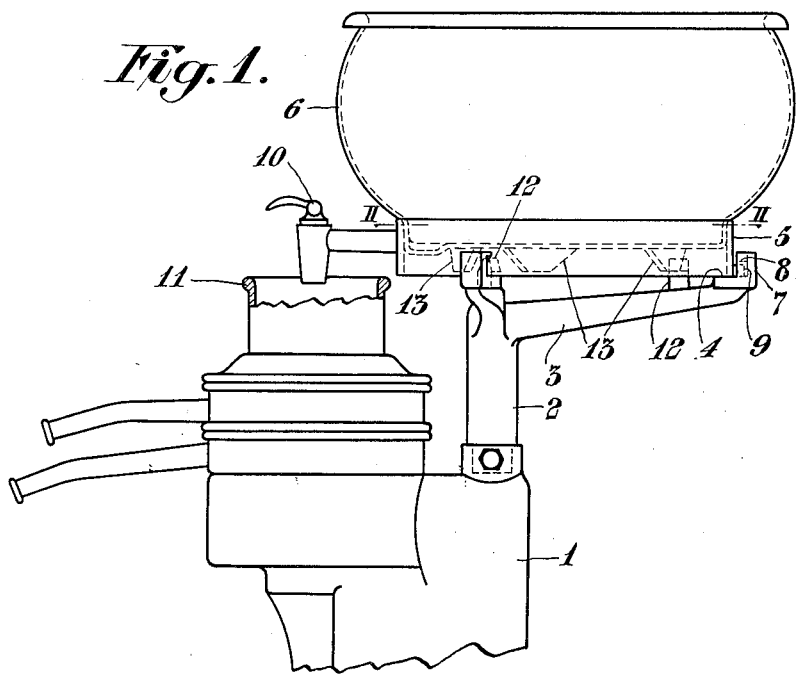
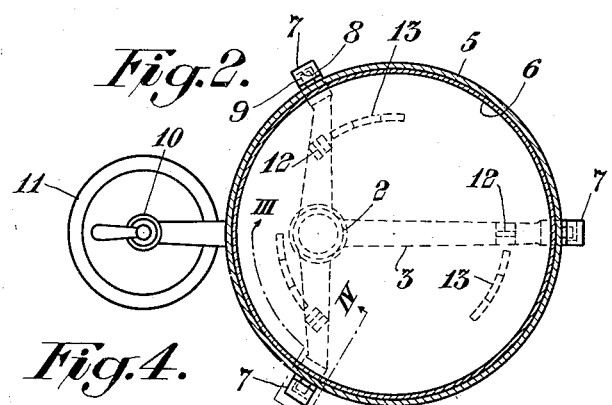
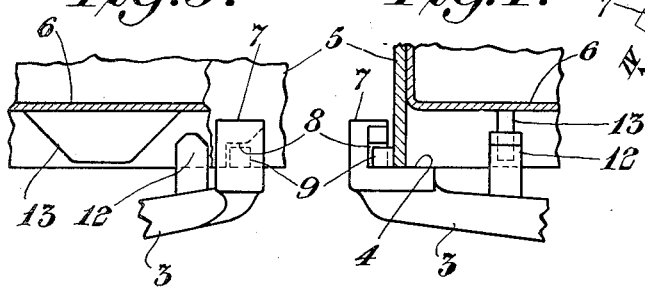
Inventor:
Hugo Lindeberg
by George Bayard Jones,
Attorney.

Patented Jan. 8, 1935

1,987,367

UNITED STATES PATENT OFFICE 1,987,367

CREAM SEPARATOR

Hugo Lindeberg, Eskilstuna, Sweden

Application September 26, 1931, Serial No. 565,228
In Sweden September 26, 1930

3 Claims. (Cl. 233—1)

The present invention relates to an improvement in cream separators provided with a milk tank carried by a support.

The main object of the present improvement is to prevent the tank from tilting on the support, for instance when the milk container rests against the edge of the tank when the latter is being filled. For this purpose the tank is provided, according to the present invention, with means, such as projections, which are adapted to engage corresponding means, abutments or the like, on the support in a manner similar to the parts of a bayonet lock, so that when in its position of use said tank is secured to the support.

Another object is to provide a device of this character in which rotation of the tank on its support, to disengage the locking members, causes the engagement of cam members on said tank and support, whereby said tank may be tilted or lifted to permit the faucet on the side thereof to clear the edge of the funnel into which it normally extends when locked in operative position.

The accompanying drawing illustrates a separator embodying the invention. Fig. 1 shows an elevation of the upper portion of a separator having a milk tank and a support for the same arranged according to the invention. Fig. 2 shows a section of the milk tank on the line II—II in Fig. 1, and shows the funnel of the separator proper. Fig. 3 shows to an enlarged scale an elevation and fractional section on the line III—III in Fig. 2, and Fig. 4 shows to an enlarged scale a section on the line IV—IV in Fig. 2.

Carried by the separator frame 1 is a tank support 2, which is shown as provided with three arms 3, the outer ends of which are provided with plane supporting surfaces 4 for the bottom ring 5 of the tank 6. Projecting upwards from said supporting surfaces 4 are lugs or abutments 7, which prevent the bottom ring 5 from sliding off the supporting surfaces 4 and thus retain the tank 6 on the support.

The abutments 7 are provided on their inner sides with recesses or notches 8 which may be engaged by projections or studs 9 on the bottom ring 5 of the tank 6 by slightly turning the tank after it is placed on the support. After said projections or studs 9 are thus moved into said recesses 8, they will prevent the tank from tilting on its support by engagement with the overhanging portions of the abutments 7. In this position of the tank, when the studs 9 are positioned in the recesses 8, the faucet 10 of the tank 6 is located above the center of the funnel 11 of the separator, as illustrated in Figs. 1 and 2.

In the said position of the tank 6 the lower end of the faucet 10 should be below the upper edge of the funnel 11, as shown in Fig. 1, in order to avoid splashing. Since in this position the tank is locked to its support, as above explained, and since the tank must be turned in order to be released from the support, it should suitably also be raised during such turning movement in order that the faucet may pass over the edge of the separator funnel, without striking the same. For this purpose there are provided bosses 12 on the arms 3, and lugs 13 having inclined surfaces are secured to the bottom of the tank 6, in such manner that after the tank 6 has been turned sufficiently to move the studs 9 out of the recesses 8, said inclined surfaces on the lugs 13 will engage said bosses 12, so that upon further turning of the tank 6 said lugs 13 will ride up on said bosses 12 and thereby raise the tank 6, so that the faucet 10 will clear the edge of the funnel 11.

It will be understood that it is not necessary to provide all of the arms 3 with bosses 12, since the necessary raising movement may also be produced by providing only one or both of the arms adjacent the funnel 11 with such bosses and the tank with one or two corresponding lugs. It will further be understood that also in other respects the invention is not limited to the constructional form above described and illustrated in the drawing.

I claim:

1. In a separator, the combination of a milk tank, a support for said tank, means on said tank and said support engageable by turning said tank on said support in one direction to lock said tank to said support, a boss on said support, and a cam member on the bottom of said tank and positioned to engage said boss and thereby raise said tank relatively to said support upon turning said tank in the opposite direction.

2. The combination with a separator frame having a funnel thereon, of a support with outer portions extending upwardly and constituting stops, a milk reservoir rotatably mounted on said support and confined by said stops, radial projections on said reservoir positioned to engage recesses in said upward extensions to prevent tilting of said reservoir, inclined surfaces on the bottom of said reservoir, cooperating portions positioned on said support in the path of movement of said inclined surfaces when said reservoir is rotated to disengage said locking members and a faucet projecting from said reservoir with its outlet normally below the top of said funnel when said reservoir is locked in place, whereby rotation thereof in a direction to unlock the same will lift said faucet and permit it to clear the edge of said funnel.

3. In a separator, the combination of a milk tank, a support for said tank, cooperating engaging means locking said tank to said support, said locking means being disengaged by turning the tank on its support in one direction, and cooperating cam means on said tank and on said support to raise said tank by the engagement of said cam means upon further turning said tank on said support in the same direction.

HUGO LINDEBERG.